United States Patent
Neuman et al.

(10) Patent No.: US 7,595,843 B2
(45) Date of Patent: Sep. 29, 2009

(54) PULLDOWN FIELD DETECTOR

(75) Inventors: Darren Neuman, Palo Alto, CA (US); Joseph Del Rio, San Jose, CA (US); Vadim Kochubievski, Willowdale (CA); Craig Zinkievich, Boulder Creek, CA (US); Shannon Posniewski, San Jose, CA (US); Alexander G. MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 1175 days.

(21) Appl. No.: 10/778,474

(22) Filed: Feb. 12, 2004

(65) Prior Publication Data

US 2004/0227852 A1 Nov. 18, 2004

Related U.S. Application Data

(60) Provisional application No. 60/452,385, filed on Mar. 5, 2003.

(51) Int. Cl.
*H04N 9/64* (2006.01)
(52) U.S. Cl. ........................ 348/700; 348/441; 348/448; 348/452
(58) Field of Classification Search ......... 348/448–449, 348/441, 452, 459, 558, 700, 911, 97, 451, 348/458; *H04N 9/64*
See application file for complete search history.

(56) References Cited

U.S. PATENT DOCUMENTS

| | | | | | |
|---|---|---|---|---|---|
| 5,317,398 | A | * | 5/1994 | Casavant et al. | 348/570 |
| 5,852,473 | A | * | 12/1998 | Horne et al. | 348/558 |
| 6,704,055 | B1 | * | 3/2004 | He et al. | 348/449 |
| 7,203,238 | B2 | * | 4/2007 | Liu et al. | 375/240.17 |
| 7,283,174 | B2 | * | 10/2007 | Tokuhara et al. | 348/448 |

FOREIGN PATENT DOCUMENTS

WO WO 02/089477 A1 * 7/2002

* cited by examiner

*Primary Examiner*—Trang U Tran
(74) *Attorney, Agent, or Firm*—McAndrews, Held & Malloy, Ltd.

(57) ABSTRACT

A system and method for detecting the presence and location of pull-down fields in a video field stream. Various aspects of the present invention may comprise method steps and circuit structure for generating an array of variance indications, each of which represents a degree of variance between two video fields in the video field stream. Various aspects may comprise comparing the array of variance indications to a pattern to detect a pull-down field in the video field stream. Various aspects may comprise comparing corresponding portions of video fields and generating a histogram of differences between the corresponding portions. Various aspects may comprise generating an indication of variance of the histogram and analyzing the indication of variance. Various aspects may comprise analyzing an array of such indications of variance and may comprise comparing the array of such indications to a pattern or plurality of patterns.

29 Claims, 4 Drawing Sheets

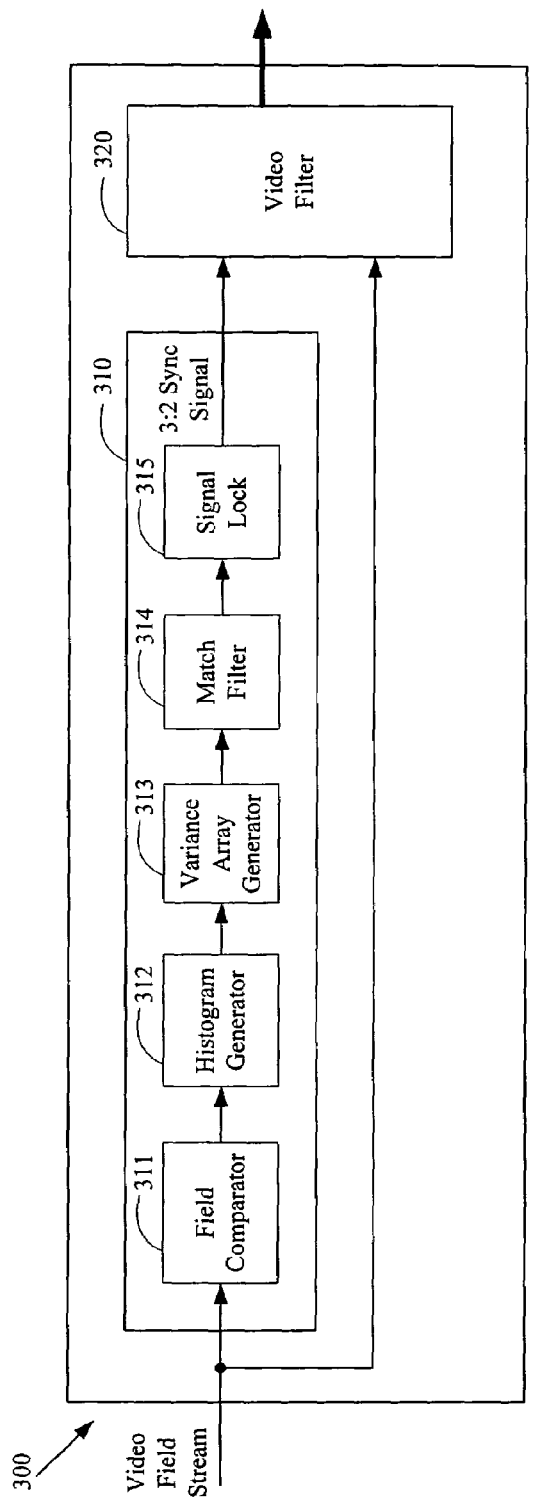
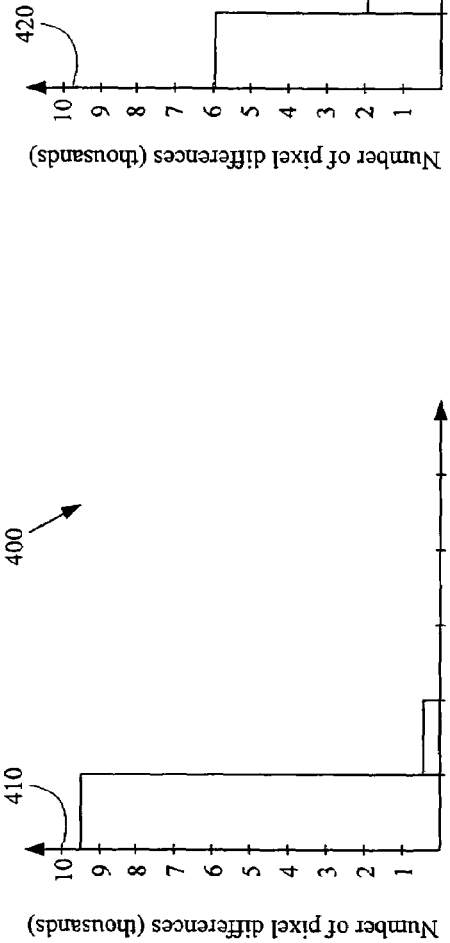
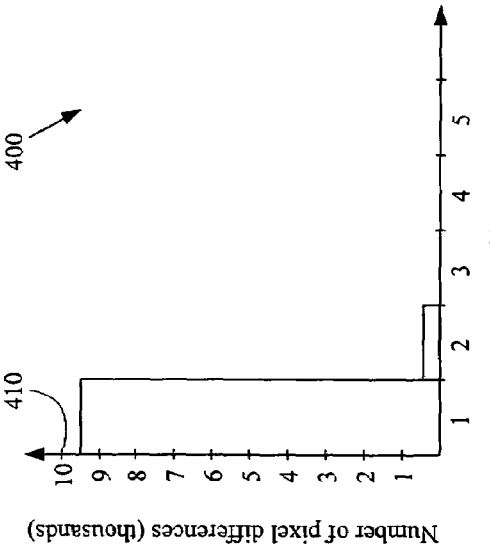
Figure 3
Figure 4

PULLDOWN FIELD DETECTOR

CROSS-REFERENCE TO RELATED APPLICATIONS/INCORPORATION BY REFERENCE

This patent application claims the benefit of U.S. Provisional Application No. 60/452,385, filed Mar. 5, 2003, the contents of which are hereby incorporated herein by reference in their entirety.

FIELD OF THE INVENTION

The present invention relates generally to processing video information. More specifically, the present invention relates to a method and system for detecting the presence and location of pull-down fields in a video field stream.

BACKGROUND OF THE INVENTION

In video systems, there is often a need to convert between video information communication formats. For example, a source of video information (e.g., a movie system) may record and provide video information in a different format than the destination of the video information (e.g., a home television system) can process. For example, a movie system may supply video information at a rate of twenty-four full frames per second, while a home television system may only be able to process an interlaced stream of sixty video fields per second (i.e., thirty pairs of top and bottom fields per second). One technique used to translate twenty-four frames/second to 60 fields/second includes converting each original frame to a top field and a bottom field transmitted consecutively, which yields 48 fields/second. Then after every fourth field, a duplicate field is inserted, which yields a final rate of 60 fields/second. This technique may be referred to as 3:2 pull-down, and the duplicate field may be referred to as a pull-down field.

Video systems that utilize the insertion of pull-down fields typically provide top and bottom fields from a single video frame, and accordingly, corresponding top and bottom fields represent an image at a single instance in time. Based on this, the receiver of such information may process corresponding top and bottom video fields to produce a single high-quality video frame. Since the existence of pull-down fields in a received stream of video fields is a indication that the received stream of video information may be so processed, detecting the existence and location of pull-down fields may be advantageous.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method are provided for detecting the presence and location of pull-down fields in a video field stream. Various aspects of the present invention may comprise generating an array of variance indications, each of which represent a degree of variance between two video fields in a stream of video fields. Generating an array of variance indications may, for example, comprise comparing corresponding portions of video fields and generating a histogram of differences between the corresponding portions; generating an indication of variance of the histogram; and compiling the indication of variance into the array of variance indications. Various aspects of the present invention may comprise comparing the array of variance indications to a predetermined pattern or a plurality of patterns to detect a pull-down field or periodic stream of pull-down fields in the video field stream. Various aspects of the present invention may comprise tracking the pattern comparison results over time.

Various aspects of the present invention may comprise a system for detecting pull-down fields in a video field stream. Various aspects of the present invention may comprise a logic circuit that compares video fields and outputs difference values resulting from the video field comparison. Various aspects of the present invention may comprise a logic circuit that processes the difference values and outputs an indication of variance of the difference values. Various aspects of the present invention may comprise a logic circuit that generates an array of the indications of variance. Various aspects of the present invention may comprise a logic circuit that compares the array of variance indications to one or more patterns to detect a pull-down field or a periodic stream of pull-down fields in the video stream. Various aspects of the present invention may comprise a logic circuit that tracks the results of the pattern comparison over time.

These and other advantages, aspects and novel features of the present invention, as well as details of illustrative aspects thereof, will be more fully understood from the following description and drawings.

BRIEF DESCRIPTION OF SEVERAL VIEWS OF THE DRAWINGS

FIG. 3 is a diagram showing a system for processing a stream of video fields in accordance with various aspects of the present invention.

FIG. 4 is a diagram illustrating field-difference histograms in accordance with various aspects of the present invention.

DETAILED DESCRIPTION OF THE INVENTION

Figures 1, 2:
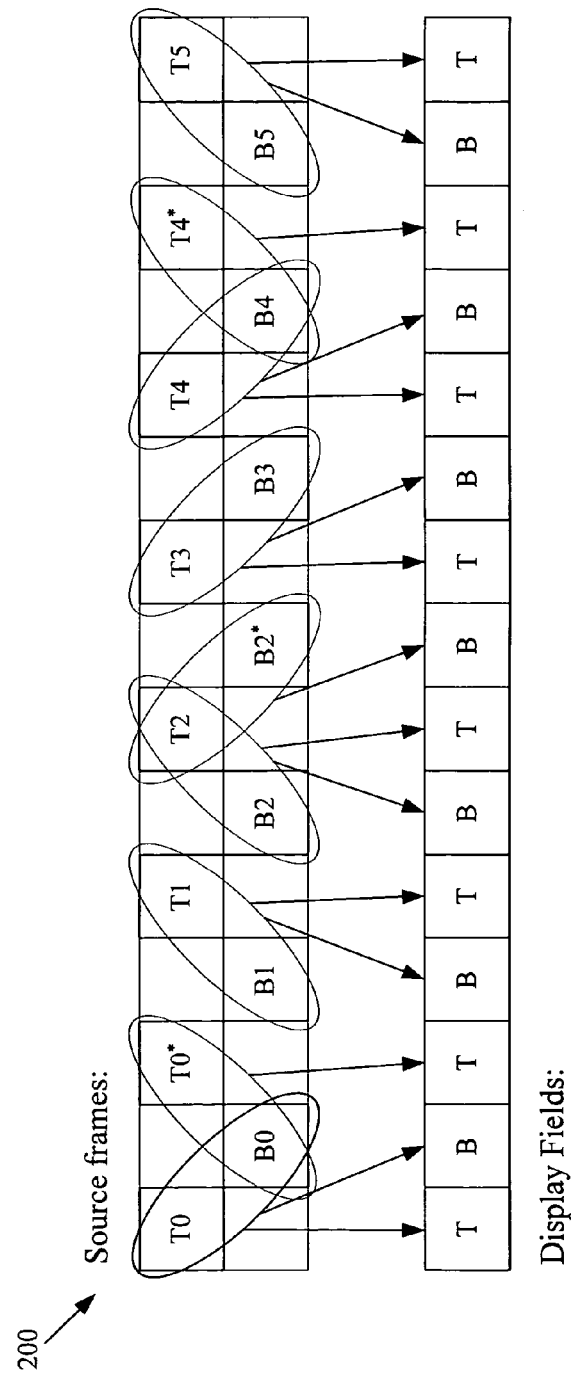
FIG. 1 is a diagram illustrating a stream of video fields that includes pull-down fields.
FIG. 2 is a diagram illustrating generating display fields by combining source fields for processing in accordance with various aspects of the present invention.

FIG. 1 is a diagram 100 illustrating a stream of video fields that includes pull-down fields. In the illustrated example, the source of the transmitted video information has video frame information at a rate of twenty-four frames per second. To match the destination's need for video information at 60 fields per second (i.e., 30 full frames, or field pairs, per second), the source first splits each frame into two fields, a top field and a bottom field. For example, the source generates a top field T0 and a bottom field B0 from a single source frame F0. This split alone allows the source to communicate video information at a rate of 48 fields (half-frames) per second.

To further adjust the 48 fields per second to the 60 fields per second that the destination desires, the source may transmit the 48 fields at a rate of 60 fields per second and then periodically pad the video field stream with an additional field. The source may do this, for example, by padding the video field stream with an additional duplicate video field after every four original video fields. The source thus further converts the 48 field per second video stream to a 60 field per second video stream.

As illustrated, the source may follow fields T0 and B0 with a T-field, T0*, that is a duplicate of the most recently transmitted T-field, T0. Field T0* may be referred to as a pull-down field. The source may then transmit fields B1 and T1, which the source generates from an original full frame F1. Similarly, the source may then transmit fields B2 and T2, which the source generates from an original full frame F2. After transmitting four original fields (B1, T1, B2 and T2), the source then may pad the video stream with a B-field, B2*, that is a duplicate field of the most recently transmitted B-field, B2. Field B2* may be referred to as a pull-down field. The source may then generate and transmit the next four original fields (T3, B3, T4 and B4) followed by a duplicate T-field, T4*, which is a duplicate field of the most recently transmitted T-field, T4. The source may then continue this pattern for the duration of the video stream communication.

FIG. 2 is a diagram 200 illustrating an example of generating high-quality display fields by combining source fields for processing in accordance with various aspects of the present invention. A receiving system (or destination system), upon receipt of the stream of video fields, may intelligently and adaptively process such fields. For example, the receiving system may detect the existence of movie video information arriving in the video field stream by detecting pull-down fields. Having detected the existence of pull-down fields, the receiving system may then process the arriving video information in a manner conducive to generating the highest quality of video presentation from that arriving video information. For example, a detector in the receiving system, upon detecting the existence of pull-down fields in the video field stream, may determine that the arriving video field stream contains movie video information generated originally from twenty-four high-resolution frames per second. The detector may, for example, locate the periodic position of the pull-down fields in the video field stream, and the receiver may utilize this known periodic position to determine which video fields in the video field stream to combine for video processing.

For example, if a pull-down field detector in the receiver detects (or knows by periodic anticipation) that field T0* is a pull-down field, then the receiver knows that the pull-down field T0* and the preceding video field B0 are from the same original movie frame, and thus represent video information obtained at the same instance in time. The receiver may then utilize the information in both fields B0 and T0* to generate a next frame or field of display image information, which in the illustration is a next T-field. Alternatively, the receiver may simply repeat the prior T-field calculated using fields T0 and B0, because ideally, pull-down field T0* may be the same as field T0.

Having just processed a pull-down field, the receiver may then process the next four fields in the video field stream as non-pull-down fields, unless for example, the detector detects a shift in the pull-down field periodicity or a discontinuation of pull-down fields. In the illustrated example, the receiver next receives video field B1. The receiver, knowing that the receiver has not yet received the T-field that temporally coincides with field B1, may wait for the arrival of the next T-field. Once the receiver has received video field T1, the receiver may process fields B1 and T1 together to generate a high-resolution video frame, or for example, two high-quality video fields (B and T) associated with such a high-resolution video frame.

The receiver next receives video fields B2 and T2, processing them in a manner similar to how the receiver processed fields B1 and T1. The receiver then receives field B2* and detects field B2* as a pull-down field. The receiver knows that the pull-down field B2* and the preceding video field T2 are from the same original movie frame, and thus represent video information obtained at the same instance in time. The receiver may then utilize the information in both fields T2 and B2 to generate a next frame or field of display image information, which in the illustration is a next B-field. Alternatively, for example, the receiver may simply repeat the prior B-field calculated using fields B2 and T2, because ideally, pull-down field B2* may be the same as field B2. The receiver next receives video field T3 and the cycle continues.

The diagram 200 of FIG. 2 is an exemplary illustration of a communication scenario having pull-down fields, portions of which serve as a basis for the following discussion. As such, FIG. 2 is merely one illustrative scenario to which various aspects of the present invention may apply. Accordingly, the scenario illustrated in FIG. 2, and later discussion of various aspects of the present invention that may refer to the scenario illustrated in FIG. 2, shall by no means limit the scope of various aspects of the present invention to any particular communication scenario.

FIG. 3 is a diagram showing a system 300 for processing a stream of video fields in accordance with various aspects of the present invention. The system 300 includes a 3:2 pull-down detector 310 and a video filter (or processor) 320. The 3:2 pull-down detector 310 receives a video field stream as input and outputs an indication of pull-down field detection. For example, the pull-down detector 310 may output a sync signal to indicate to the video filter 320 where, if at all, pull-down fields are located in the video field stream. The video filter 320 receives the video field stream and the pull-down field indication from the pull-down detector 310, and processes the video field stream according to the pull-down field indication.

The exemplary 3:2 pull-down detector 310 includes a field comparator 311, histogram generator 312, variance array former 313, match filter 314 and signal lock 315. The following discussion will address the functionality and structure associated with each of these components. The pull-down detector 310 may receive and process, for example, a video field stream as illustrated in FIGS. 1 and 2. The following discussion will focus on the pull-down detector 310 receiving and processing such a video field stream and will reference the field indications in those figures. However, various aspects of the present invention should, in no way, be limited to a particular video field stream configuration. In addition, the various functional and structural modular features illustrated in FIG. 3 and subsequently discussed were, at least in some part, chosen to modularly convey various aspects of the present invention to the reader. As such, particular functional and structure boundaries are by no means to be construed as limiting the scope of various aspects of the present invention. For example, various functional and structural components may be modularly separated or integrated without departing from the spirit and scope of various aspects of the present invention.

The field comparator 311 receives the video field stream as input. The field comparator 311 may, for example, compare each arriving video field with the video field that arrived two fields previously. For example, the field comparator 311 may, upon receiving video field T0*, compare field T0* to field T0.

In this example, the field comparator 311 looks two fields prior because the arriving video field stream contains alternating top (T) and bottom (B) fields. Though two consecutive T and B fields may correspond to the same video image at the same instance in time (i.e., temporally aligned), they generally correspond to different portions of the image (i.e., not spatially aligned). Thus, the illustrative field comparator 311 generally compares fields that are spatially aligned (i.e., compare T-fields to T-fields and B-fields to B-fields).

When comparing fields, the field comparator 311 may compare corresponding portions of the fields. For example, the comparator may compare corresponding groups of pixels in the images being compared or may, for example, compare individual corresponding pixels in the images. The comparator 311 may compare entire images or may compare a sample, or samples, of the images. For example, the comparator 311 may compare every tenth pixel, or one of every 128 blocks of 16×16 pixels. Also, by way of example, the comparator 311 may compare encoded information for the images being compared, for example, reference information and motion vectors. For clarity, the following discussion will focus on a pixel-to-pixel comparison using a subset of image pixels. However, the scope of various aspects of the present invention should, by no means, be limited to such sub-sampled pixel-to-pixel comparison.

The field comparator 311 may compare consecutive T or B fields and output an indication of differences between the compared portions of the compared fields. For example, the field comparator 311 may generate a numerical array of pixel difference values. For example, the field comparator 311 may compare ten thousand corresponding pixel values in the video fields being compared and output an array of ten thousand pixel difference values. Alternatively, for example, the field comparator 311 may perform an entire field comparison on every pixel and output an entire difference frame.

The histogram generator 312 receives the field difference information from the field comparator 311 and may generate a histogram or a similar structure of variance indications. The histogram generator 312 may, for example, categorize field difference information received from the field comparator 311 into a set of histogram bins. Each bin may correspond to a set of difference values. For example, a histogram may have 64 bins, each of which correspond to four pixel difference values. Bin 1 may contain the number of compared pixels that differed in the range of 0 to 3, bin 2 may correspond to all compared pixels that differed in the range of 4 to 7, and so on. The bins need not correspond to equal ranges.

FIG. 4 is a diagram illustrating field-difference histograms 400 in accordance with various aspects of the present invention. FIG. 4 illustrates an exemplary pull-down field difference histogram 410 that graphically illustrates an exemplary histogram exhibiting characteristics of a video field comparison between a pull-down field and a predecessor field. Ideally, a pull-down field may be an exact duplicate of the predecessor field, and thus there would be no differences at all between a pull-down field and the predecessor field. However, even though a pull-down field may originate as a perfect copy, it may not remain a perfect copy throughout the entire communication process. Accordingly, as illustrated in the pull-down field difference histogram 410, although 95% of the 10,000 pixel difference values are in bin 1 (i.e., in the 0-3 range), the other 5% are in bin 2 (i.e., in the 4-7 range).

FIG. 4 illustrates an exemplary non-pull-down field difference histogram 420 that illustrates an exemplary histogram exhibiting characteristics of a video field comparison between a non-pull-down field and a predecessor field, for example, two fields that may correspond spatially but not temporally. Since, for example, the compared fields do not correspond temporally, there are typically differences between the fields, except in the case of a perfect still shot. The non-pull-down field difference histogram 420 illustrates the results of an exemplary non-pull-down field comparison, where 60% of the corresponding pixel values are still relatively close (i.e., in bin 1), perhaps being pixels corresponding to non-moving background images, but bins 2-5 contain substantially more pixel differences than bins 2-5 of the pull-down field difference histogram 410.

Comparing the pull-down field difference histogram 410 and the non-pull-down field difference histogram 420, the distribution in the pull-down field difference histogram 410 is relatively narrow, while the distribution in the non-pull-down field difference histogram 420 is relatively large. Accordingly, a field comparison involving a pull-down field may generally correspond to a relatively narrow field difference histogram distribution, while a field comparison involving a non-pull-down field may generally correspond to a relatively large field difference histogram distribution. In other words, a field comparison involving a pull-down field may generally result in a distribution with relatively low variance, and a field comparison involving non-pull-down fields may generally result in a distribution with relatively high variance.

The previous example has focused on a histogram categorization of field difference information. The histogram may be a convenient format in which to categorize and visualize field difference and variance information. However, the utilization of a histogram in the present example should, by no means, limit the scope of various aspects of the present invention to histogram implementations. For example, a system may utilize a standard distribution analysis, foregoing the use of histogram bins. Alternatively, for example, a system may only utilize a one-bin histogram or, for example, only track relatively small video field pixel differences.

Referring back to FIG. 3, the histogram generator 312 outputs field comparison histogram information to the variance array former 313. The nature of the histogram information may be varied. For example, the histogram information may be in an array of histogram bin values. The histogram information may, for example, be the number of pixel differences in bin 1 of the histogram, or the number of pixel differences in bins 1 and 2 of the histogram, or the number of pixel differences in all bins other than bin 1. Accordingly, the scope of various aspects of the present invention should not be limited to a particular form of histogram information.

The histogram generator 312 may be implemented in a variety of ways. For example, the histogram generator 312 may be implemented in an application-specific integrated circuit, or may, for example, be implemented with a processor executing software instructions. The histogram generator 312 may be implemented, for example, in logic circuitry that includes both dedicated hardware and a processor executing instructions. Accordingly, the scope of various aspects of the present invention should, by no means, be construed to be limited to a particular hardware or software implementation.

The variance array generator 313 may receive field comparison histogram information from the histogram generator 312. The variance array generator 313 may process the received histogram information to determine an indication of the variance of the histogram information. The variance indication may, for example, be the proportion of pixel differences in the first histogram bin or first two histogram bins. The variance indication may, for example, be an absolute number of pixel differences in a bin or set of bins. The variance indication may, for example, be a numerical result calculated from any of a variety of well-know statistical variance formulas.

Figure 5:
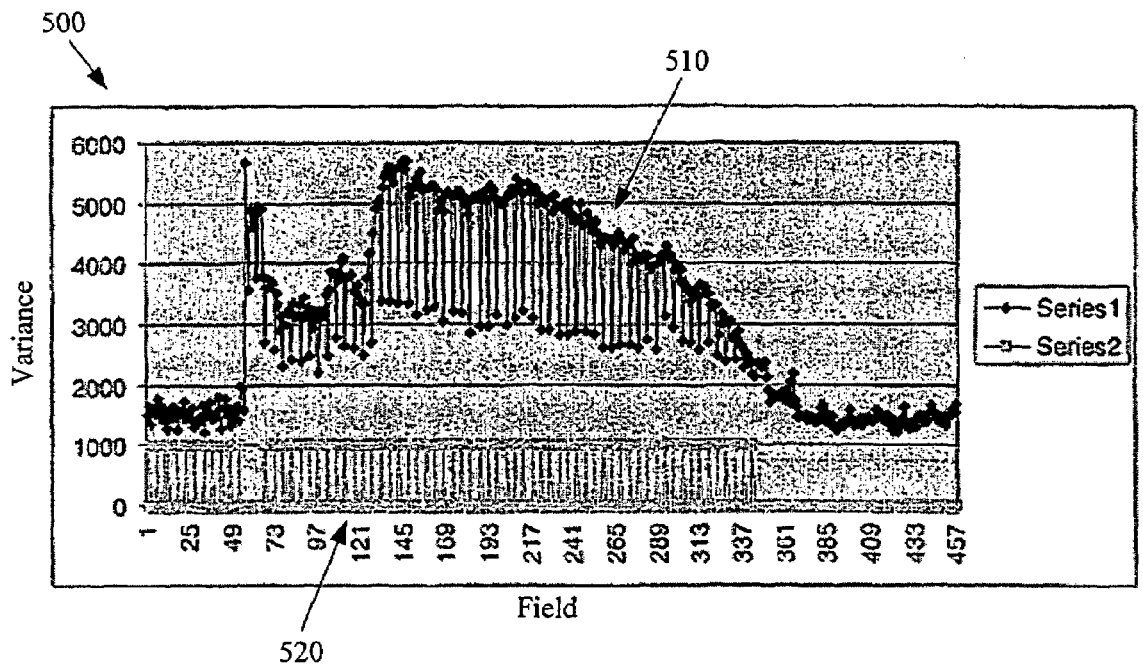
FIG. 5 is a diagram illustrating an array of field variance indications in accordance with various aspects of the present invention.

The variance array generator 313 may receive field comparison histogram information for each video field comparison in a sequence of video field comparisons. The variance array generator 313 may, upon receiving or determining a variance indication for each of the field comparison histograms, process the variance indications of the field comparison histograms into an array of field variance indications. FIG. 5 graphically illustrates an exemplary array of variance indications.

FIG. 5 is a diagram 500 illustrating an array of field variance indications in accordance with various aspects of the present invention. The diagram 500, on the horizontal axis, shows a number corresponding to the video field(s) upon which the video field comparison was based. The diagram 500, on the vertical axis, shows a number corresponding to the variance indication of the video field comparison. The top plot 510 on the diagram 500 shows field comparison variance indications plotted over a time sequence of video fields. The bottom plot 520 on the diagram 500 shows an indication of lock plotted over a time sequence of video fields, which will be discussed later.

Since, in the exemplary video field stream, as illustrated in FIGS. 1 and 2, every fifth video frame is a pull-down frame, every fifth video field comparison will generally result in a histogram of pixel differences with a relatively low variance. The plot of field comparison variance indications 510 illustrates this phenomenon. For example, referring to the middle portion of the plot 510, every fifth point plotted has a significantly lower variance than the four preceding and succeeding points. The middle portion of the plot 510 thus may represent a portion of the video frame stream that contains pull-down material. For comparison, the right-side of the plot of field comparison variance indications 510 may correspond to a portion of the video frame stream that does not contain pull-down material. This is illustrated by the plotted points having a relatively consistent variance.

The variance array generator 313 may be implemented in a variety of ways. For example, the variance array generator 313 may be implemented in an application-specific integrated circuit, or may, for example, be implemented with a processor executing software instructions. The variance array generator 313 may be implemented, for example, in logic circuitry that includes both dedicated hardware and a processor executing instructions. Accordingly, the scope of various aspects of the present invention should, by no means, be construed to be limited to a particular hardware or software implementation.

Referring back to FIG. 3, the variance array generator 313 may output an array of field comparison variance indications to the match filter 314. The array of variance indications may, for example, be an array as illustrated by the top plot 510 in FIG. 5. Alternatively, the variance array generator 313 may, for example, maintain a relatively small rolling set of variance indications (e.g., a set of the six most recent variance indications). Accordingly, the scope of various aspects of the present invention should, by no means, be limited by a particular variance array data structure or form.

The match filter 314 may process the array of variance indications to determine the existence and location of pull-down fields. The match filter 314 may, for example, compare the array of field comparison variance indications to a predetermined pattern or set of patterns to determine the existence and periodic location of pull-down fields in the stream of video fields.

Figure 6:
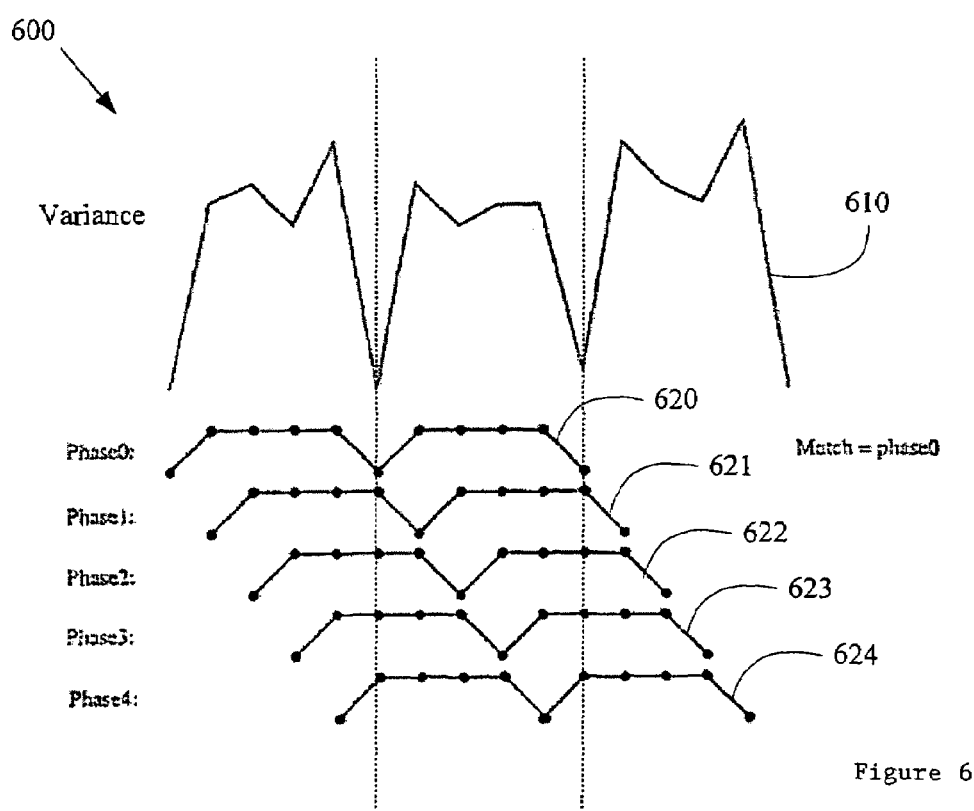
FIG. 6 is a diagram illustrating comparing an array of field variance indications to patterns in accordance with various aspects of the present invention.

FIG. 6 is a diagram 600 illustrating comparing an array of field variance indications to patterns in accordance with various aspects of the present invention. FIG. 6 shows an exemplary array 610 of variance indications. The array of variance indications 610 shows every fifth variance indication being low relative to the four preceding and four succeeding indications. As discussed previously, this is an indication of the existence of pull-down fields in the input stream of video fields.

To determine the existence and location of pull-down fields in the stream of video fields, the match filter 314 may compare the array of field comparison variance indications to the five patterns 620-624 illustrated below the array 610 of variance indications. As shown, the five patterns 620-624 may represent a single base pattern 620 that is temporally shifted (or phase-shifted) to form the other patterns 621-624. The base pattern 620 may, for example, be a pattern representative of a single point having one value and four successive points having a second value. The pattern may be periodically repeating. Such a pattern may be particularly well-suited to determining the existence of 3:2 pull-down fields, because as discussed previously, such a pattern follows the general pattern of field differences in a stream of video fields having 3:2 pull-down fields. Comparing such a base pattern 620 and temporally (or phase) shifted versions of the base pattern to the array of variance indications 610 may provide an indication of the existence and location of pull-down fields in the stream of video fields.

The match filter 314 may compare the patterns 620-624 to the array of variance indications 610 in a variety of ways. For example, the match filter 314 may multiply the elements of each pattern 620-624 to corresponding elements of the array of variance indications 610 and calculate the sum of the individual multiplies. The match filter 314 may then analyze the sums for all of the patterns 620-624 to determine the relative degree of match between the patterns 620-624 and the array of variance indications 610 to determine the existence and location of pull-down fields. Alternatively, for example, the match filter 314 may calculate an indication of statistical correlation between each of the patterns 620-624 and the array of variance indications 610. The match filter 314 may then analyze the respective degrees of statistical correlation to determine the existence and location of pull-down fields in the stream of video fields.

The match filter 314 may, for example, calculate Pearson's coefficient, which is an indication of statistical covariance, between each of the patterns 620-624 and the array of variance indications 610. For example, Pearson's coefficient may have values between −1.0 and 1.0, with 1.0 corresponding to a high degree of covariance and −1.0 corresponding to a low degree of covariance. A relatively high Pearson's coefficient of 0.5, for example, may be an indication of a relatively strong pattern match between the compared pattern and the array of variance indications 610. Such a high Pearson's coefficient between a particular pattern and the array of variance indications 610 may thus serve as an indication of the existence of a corresponding pattern of pull-down fields in the stream of video fields.

The exemplary scenario 600 illustrated in FIG. 6 shows the first pattern 620 matching relatively well with the general pattern of the array of variance indications 610. Accordingly, the match filter 314 may determine a relatively high correlation between the first pattern 620 and the array of variance indications 610 and a relatively low correlation between the other patterns 621-624 and the array of variance indications 610. The relatively high correlation between the first pattern 620 and the array of variance indications 620 and relatively low correlation between the other patterns 621-624 and the array of variance indications 620 may be an indication of both the existence and the periodic location of pull-down fields in the stream of video fields.

The match filter 314 may output an indication of the comparison (or pattern matching) results for each of the patterns 620-624. The match filter 314 may output actual results of comparison calculations or may output a binary indication. For example, the match filter 314 may output the calculated Pearson's coefficient for each of the patterns 620-624 or may, for example, output a binary indication for each of the patterns utilizing a Pearson threshold. The match filter 314 may alternatively, for example, output an indication of the comparison results for only patterns resulting in high matching probabilities. Accordingly, the scope of various aspects of the present invention should, by no means, be limited to particular match filter output.

The match filter 314 may be implemented in a variety of ways. For example, the match filter 314 may be implemented in an application-specific integrated circuit. The match filter 314 may, for example, be implemented utilizing a processor executing software or firmware instructions. The match filter 314 may also, for example, be implemented using a combination of dedicated hardware and general processing. Accordingly, the scope of various aspects of the present invention should, by no means, be limited to a particular match filter implementation.

While the existence of a high correlation between a pattern and the array of variance indications may be an indication of the existence and location of pull-down fields in the stream of video fields, the degree of confidence associated with a single match may not be high enough to base video processing decisions on. Accordingly, the pull-down detector 310 may process information output from the match filter 314 over time to establish the desired degree of confidence.

Figure 7:
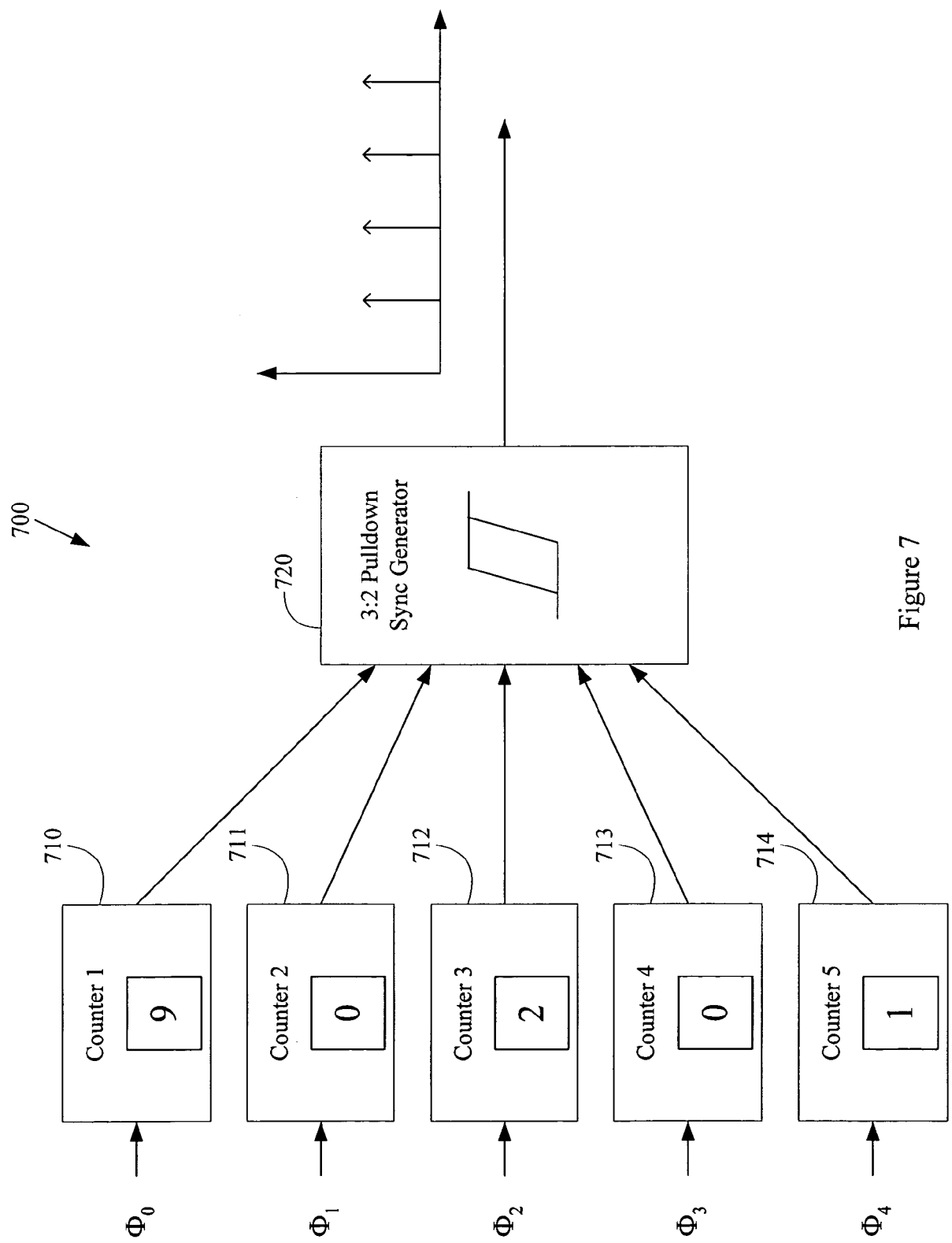
FIG. 7 is a diagram illustrating maintaining indications of pattern match frequency in accordance with various aspects of the present invention.

Referring back to FIG. 3, the match filter 314 may output its pattern-matching results to a signal lock 315. The signal lock 315 may, for example, incorporate various aspects of the exemplary signal lock module 700 illustrated in FIG. 7. FIG. 7 is a diagram 700 illustrating an exemplary signal lock module that maintains indications of pattern match frequency over time in accordance with various aspects of the present invention.

The signal lock module 700 may utilize five counters 710-714, which may be triggered, for example, by output signals from the match filter 314. For example, a signal from the match filter 314 that indicates a match between the first pattern 620 and the array of variance indications 610 may trigger the first counter 710 (corresponding to phase 0) to increment. Conversely, for example, a signal from the match filter 314 that indicates that there is currently no match between the first pattern 620 and the array of variance indications 610 may trigger the first counter 710 (corresponding to phase 0) to decrement. Similarly, signals from the match filter 314 regarding the second through fifth patterns 621-624 may trigger corresponding second through fifth counters 711-714 in the signal lock module 700.

The signal lock module 700 counters 710-714 may maintain counts of respective pattern matches and thus track recent pattern-matching activity. In the illustrated example, the first counter 710 indicates the highest level of recent pattern-matching for the first pattern 620 (i.e., the phase 0 pattern) and relatively low levels of recent pattern-matching for the second through fifth patterns (621-624). This is indicative of the video field stream likely having pull-down fields that are periodic and in-phase with the first pattern 620. In other words, in the recent history of video field arrivals, the match filter 314 has indicated that the first pattern 620 matches the array of variance indications at a rate far in excess of the other patterns 621-624. Thus, the counters 710-714 perform an integrating (or low-pass filtering) function over time to develop a relatively high degree of confidence in generating a periodic pull-down field determination.

The counters 710-714 may have limited ranges. For example, the counters may be bounded by a minimum value of "0" and a maximum count of "12." Such saturation values may provide for balance between a degree of confidence established over time and the ability of the signal lock module 700 to respond quickly to a change in pull-down field activity. For example, consider a case where the threshold for a particular pull-down pattern (or phase) determination is ">=6." If the counter associated with the particular pull-down phase determination is currently saturated at 12, a change in pull-down field activity could be detected in as few as seven consecutive pattern match failures (i.e., signals from the matching filter 314 that trigger the counter to decrement below "6").

The signal lock module 700 may include a pull-down sync generator 720 that processes the count information for each of the counters 710-714 and outputs a sync signal synchronized to the periodic arrival of pull-down fields in the video field stream. As illustrated, the sync generator 720 may utilize hysteresis to reduce unnecessary toggling of the sync generator 720 output. For example, the sync generator 720 may output a sync signal when a counter exceeds a value of 7 and continue to output the sync signal until the counter value drops below 5.

The output of the pull-down sync generator 720 may, for example, be a sequence of timing impulses, as illustrated, generated to indicate to subsequent circuitry the existence and location of pull-down fields in a video field stream. Referring to FIG. 5, the bottom plot 520, shows an exemplary indication of lock (or match) that may be output from the sync generator 720 or used for internal processing. Alternatively, the output of the sync generator 720 may, for example, be a phase value or temporal offset into the video field stream relative to a reference value. The output of the sync generator 720 may be an absolute number indicating a next pull-down frame. Accordingly, the scope of various aspects of the present invention should not be limited to a particular input or output of the sync generator 720.

The counters 710-714 and sync generator 720 may be implemented in a variety of ways. For example, the counters 710-714 and sync generator 720 may be implemented in an application-specific integrated circuit. Alternatively, for example, the sync generator 720 may be implemented by a processor executing software or firmware instructions. Alternatively, for example, the counters 710-714 and sync generator 720 may be implemented with a combination of dedicated hardware and a processor executing instructions. Accordingly, the scope of various aspects of the present invention should not be limited to a particular implementation of the counters 710-714 and the sync generator 720.

Referring back to FIG. 3, the output of the sync generator 720, and thus the 3:2 pull-down detector 310, may be a sync signal as illustrated in FIG. 7. The video filter 320 may then utilize this pull-down field sync signal to process the video field stream according to the specialized processing discussed earlier. The video filter 320, receiving such a sync signal from the 3:2 pull-down detector 310 knows that the video field stream contains 3:2 pull-down fields and knows where the pull-down fields are located in the video field stream. The video filter 320 may thus process the video field stream to generate a higher quality output image for the viewer.

The pull-down detector 310 may have functionality or structure in addition to that discussed above. For example, the match filter 314 may have functionality or structure to look for high variance regions, which may correspond to frame or field transitions in the incoming stream of video data. The system could then treat such transition fields or frames in accordance with processing designed to hand such transition fields or frames.

Additionally, for example the pull-down detector 310 may have additional functionality or structure to detect still frames. For example, a still frame may have low field variance over time, so in some ways may exhibit the low-variance characteristic of pull-down frames. However, still frames will generally not result in the periodicity of pull-down frames, and thus this periodicity, or lack thereof, could be utilized to indicate the existence of still frames. For example, the pull-down detector 310 may have a still-frame detection module that analyzes the variance over a previous set number of field comparisons to detect the existence of a still frame transmission. The system may then process the detected still frames according to specialized processing developed for still frames.

In summary, a system, apparatus and method are provided detecting the presence and location of pull-down fields in a video field stream. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for detecting a pull-down field in a stream of video fields, the method comprising:
    generating an array of variance indications, each of the variance indications representing a degree of variance between two video fields in the stream of video fields;
    comparing the array of variance indications to a plurality of predetermined patterns to detect a pull-down video field in the stream of video fields; and
    maintaining respective indications of a freciuencv at which each of the plurality of predetermined patterns correlates to the array of variance indications.

2. The method of claim 1, wherein generating an array of variance indications comprises generating a first variance indication, and generating the first variance indication comprises:
    determining levels of difference between a plurality of portions of a first video field in the stream of video fields and corresponding portions of a second video field in the stream of video fields; and
    determining the first variance indication as an indication of variance of the levels of difference.

3. The method of claim 1, wherein generating an array of variance indications comprises generating a first variance indication, and generating the first variance indication comprises:
    determining pixel difference values between a plurality of pixel values of a first video field in the stream of video fields and corresponding pixel values of a second video field in the stream of video fields; and
    determining the first variance indication as an indication of variance of the pixel difference values.

4. The method of claim 3, wherein determining the first variance indication as an indication of variance of the pixel difference values comprises:
    generating a histogram of the pixel difference values;
    determining the variance of the histogram; and
    determining the first variance indication based on the variance of the histogram.

5. The method of claim 1, wherein comparing the array of variance indications to a predetermined pattern comprises calculating the correlation between the array of variance indications and the predetermined pattern.

6. The method of claim 1, wherein the predetermined pattern is characterized by the general pattern of 3:2 pull-down fields in a stream of video fields.

7. The method of claim 1, further comprising comparing the array of variance indications to at least one predetermined pattern to ascertain the periodic location of a pull-down video field in the stream of video fields.

8. The method of claim 1, further comprising calculating respective correlations between the array of variance indications and each of the plurality of predetermined patterns to ascertain the periodic location of a pull-down field in the stream of video fields.

9. The method of claim 1, wherein the plurality of predetermined patterns are characterized by shifted versions of a single predetermined base pattern.

10. A method for detecting a pull-down field in a stream of video fields, the stream of video fields having, sequentially, a first video field, a second video field, a third video field, and a fourth video field, the method comprising:
    comparing corresponding portions of the first video field and the third video field;
    generating a first histogram of differences of the compared portions of the first video field and the third video field;
    generating a first indication of variance of the first histogram; and
    determining whether the third video field is a pull-down field by comparing the first indication of variance to a first value.

11. The method of claim 10, further comprising:
    comparing corresponding portions of the second video field and the fourth video field;
    generating a second histogram of differences of the compared portions of the second video field and the fourth video field; and
    generating a second indication of variance of the second histogram, wherein determining whether the third video field is a pull-down field further comprises comparing the second indication of variance to a second value.

12. The method of claim 10, wherein the first value is a value in an array of values corresponding to a pull-down field paffern.

13. The method of claim 11, wherein the first and second values are values in an array of values corresponding to a pull-down field paffern.

14. The method of claim 11, further comprising incrementing a counter when the third video field is determined to be a pull-down field.

15. The method of claim 14, further comprising decrementing the counter when the third video field is determined not to be a pull-down field.

16. The method of claim 15, further comprising analyzing the state of the counter using hysteresis to determine whether the video field stream contains pull-down fields.

17. The method of claim 10, wherein the corresponding portions of the first video field and the third video field are pixels.

18. A system for detecting pull-down fields in a video field stream, the system comprising:
- a first logic circuit that compares two video fields and outputs difference values resulting from the comparison;
- a second logic circuit coupled to the first logic circuit that receives the difference values from the first logic circuit and outputs an indication of variance of the difference values;
- a third logic circuit coupled to the second logic circuit that receives the indication of variance from the second logic circuit and outputs the indication of variance in an array of variance indications;
- a fourth logic circuit coupled to the third logic circuit that receives the array of variance indications, compares the array of variance indications to a predetermined pattern, and outputs an indication of whether the array of variance indications and the predetermined pattern correspond; and
- a counter circuit coupled to the fourth logic circuit that receives the outputted indication of the fourth logic circuit of whether the array of variance indications and the predetermined pattern correspond.

19. The system of claim 18, wherein the second logic circuit comprises:
- a first logic sub-circuit that receives the difference values as input and outputs a histogram; and
- a second logic sub-circuit that calculates an indication of variance of the histogram.

20. The system of claim 18, wherein the predetermined pattern corresponds to a pull-down field pattern.

21. The system of claim 18, wherein the first logic circuit compares the two video fields by comparing corresponding portions of the two video fields.

22. The system of claim 18, wherein the first logic circuit compares the two video fields by comparing corresponding pixel values of the two video fields.

23. The system of claim 18, wherein the fourth logic circuit includes a logic sub-circuit that compares the array of variance indications to the predetermined pattern by calculating an indication of correlation between the array of variance indications and the predetermined pattern.

24. The system of claim 23, wherein the counter circuit increments when the fourth logic circuit outputs an indication that the array of variance indications and the predetermined pattern correspond and decrements when the fourth logic circuit outputs an indication that the array of variance indications and the predetermined pattern do not correspond.

25. The system of claim 24, further comprising a hysteresis circuit coupled to the counter circuit that processes the state of the counter circuit using hysteresis to determine if the video field stream contains pull-down fields.

26. The system of claim 18, wherein the fourth logic circuit includes a logic sub-circuit that compares the array of variance indications to the predetermined pattern by calculating the covariance between the array of variance indications and the predetermined pattern.

27. The system of claim 18, wherein the fourth logic circuit compares the array of variance indications to a plurality of predetermined patterns.

28. The system of claim 27, further comprising a fifth logic circuit having counter circuits that indicate the frequency at which each of the plurality of predetermined patterns correspond to the array.

29. The system of claim 18, wherein:
- the first logic circuit further compares two other video fields and outputs other difference values resulting from the further comparison;
- the second logic circuit further outputs an other indication of variance of the other difference values; and
- the third logic circuit further receives the other indication of variance from the second logic circuit and includes the other indication of variance in the array of variance indications.

* * * * *

UNITED STATES PATENT AND TRADEMARK OFFICE
CERTIFICATE OF CORRECTION

PATENT NO.       : 7,595,843 B2  Page 1 of 1
APPLICATION NO. : 10/778474
DATED            : September 29, 2009
INVENTOR(S)      : Neuman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1545 days.

Signed and Sealed this

Twenty-eighth Day of September, 2010

David J. Kappos
*Director of the United States Patent and Trademark Office*